United States Patent [19]

Isler

[11] 4,041,835

[45] Aug. 16, 1977

[54] TORQUE TRANSMITTING APPARATUS

[75] Inventor: Ernst R. Isler, Zurich, Switzerland

[73] Assignee: Helena A. M. Isler, Zurich, Switzerland

[21] Appl. No.: 642,209

[22] Filed: Dec. 18, 1975

[51] Int. Cl.² .............................................. F16H 3/74
[52] U.S. Cl. .................................. 74/751; 74/781 R; 74/674
[58] Field of Search ............... 74/674, 750 R, 751, 74/752 F, 781 R

[56] References Cited

U.S. PATENT DOCUMENTS

| 3,154,971 | 11/1964 | Cicin | 74/752 F X |
| 3,540,308 | 11/1970 | Preston | 74/751 |

Primary Examiner—Samuel Scott
Assistant Examiner—Frank H. McKenzie, Jr.
Attorney, Agent, or Firm—Bernard L. Kleinke

[57] ABSTRACT

An apparatus for transmitting torque from a prime mover to a load includes an input planetary gear unit adapted to be connected drivingly to the output of the prime mover, and an output planetary gear unit coupled to the input unit and adapted to be connected drivingly to the input of the load. A reaction member connects rigidly the output planet gears of the output planetary gear unit and one of the input sun gears of the input unit for causing the input planetary gears of the input unit to orbit about the input planet gears, whereby the input unit serves to unload the prime mover to enable it to operate more efficiently.

11 Claims, 12 Drawing Figures

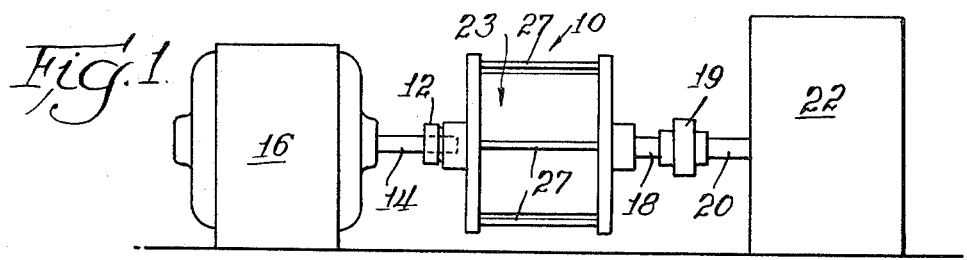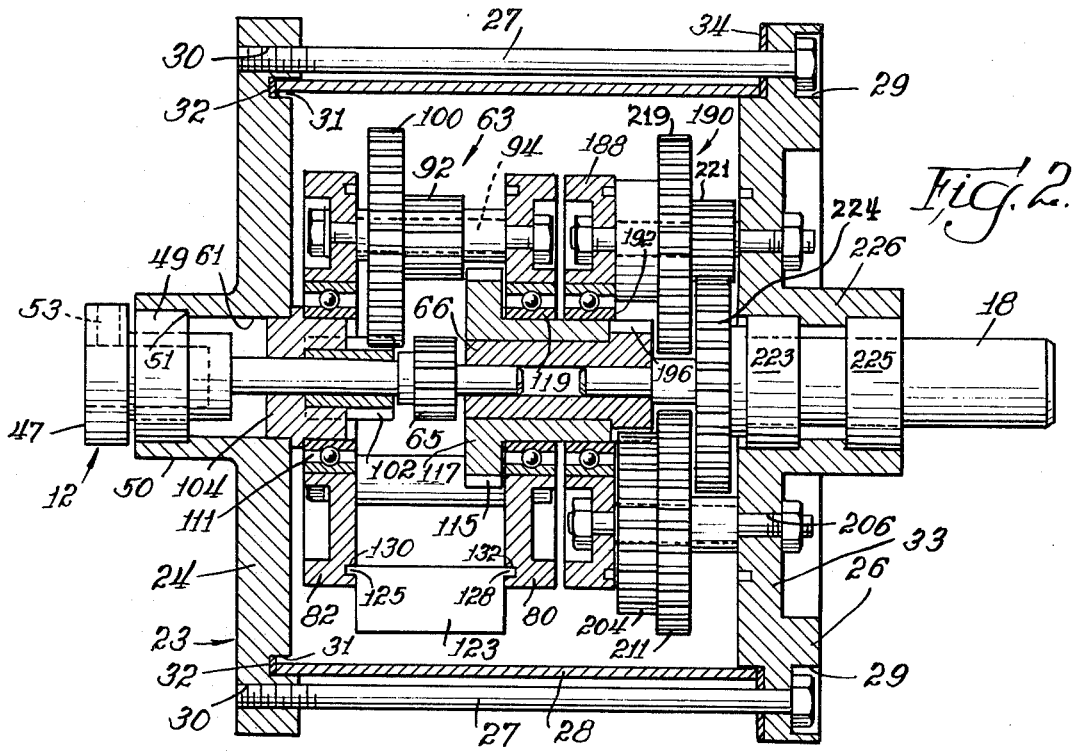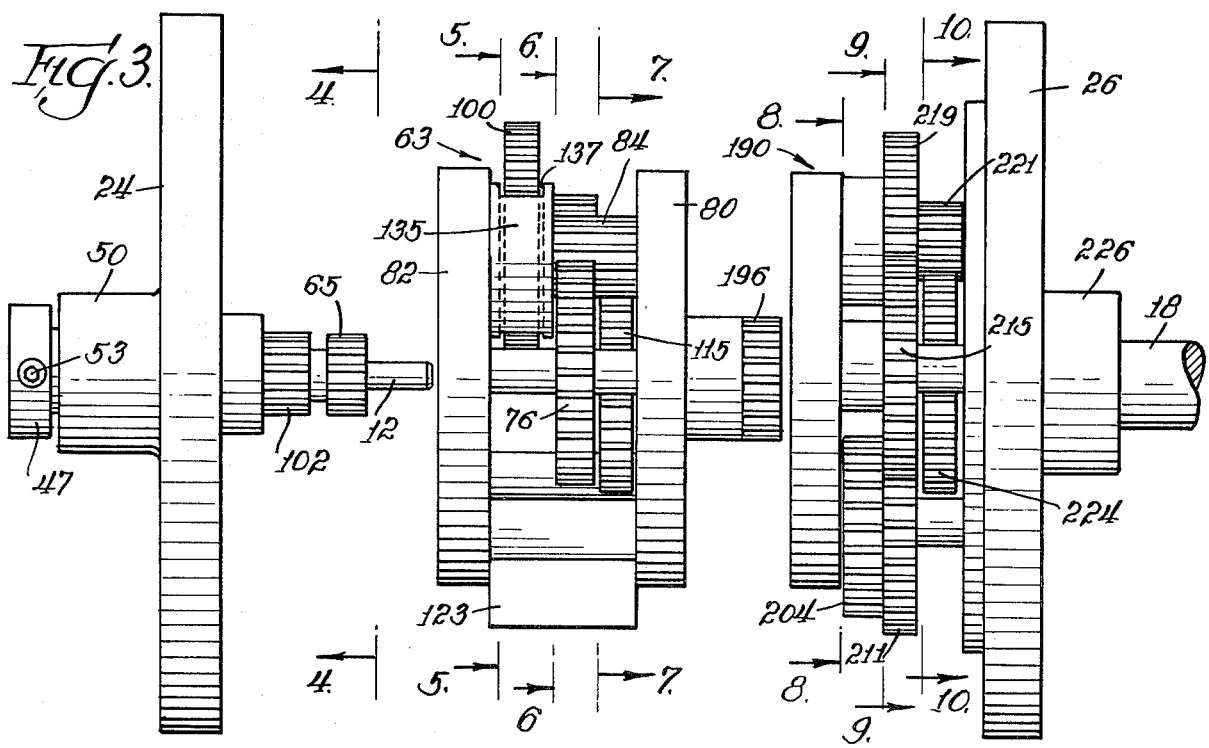

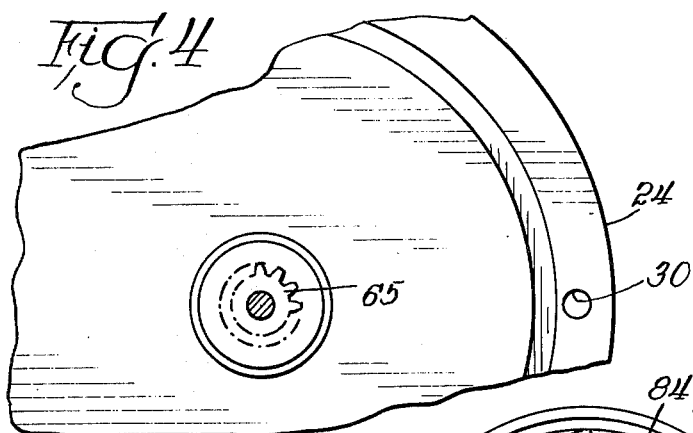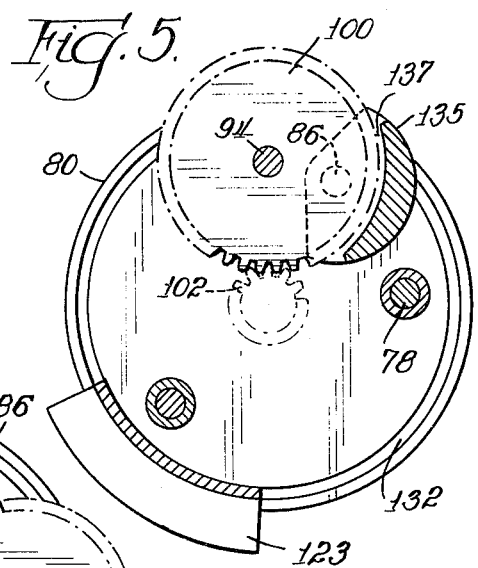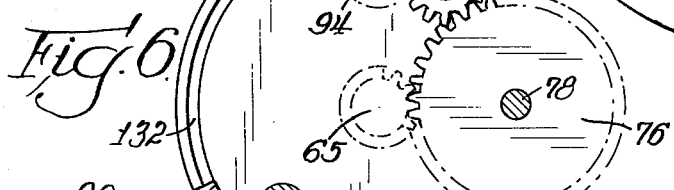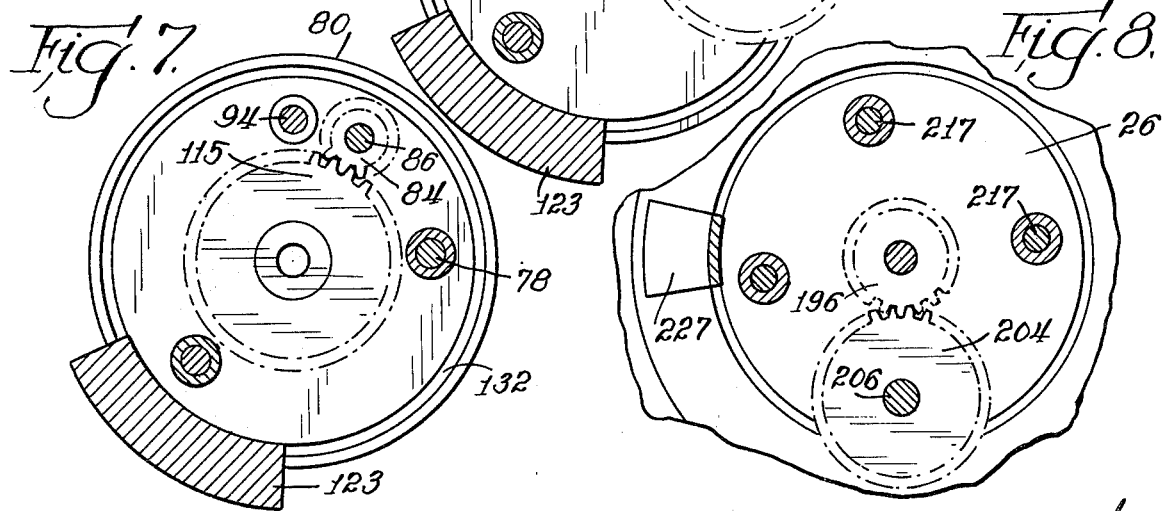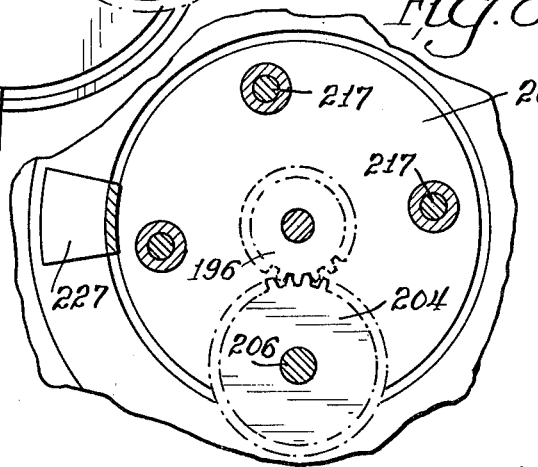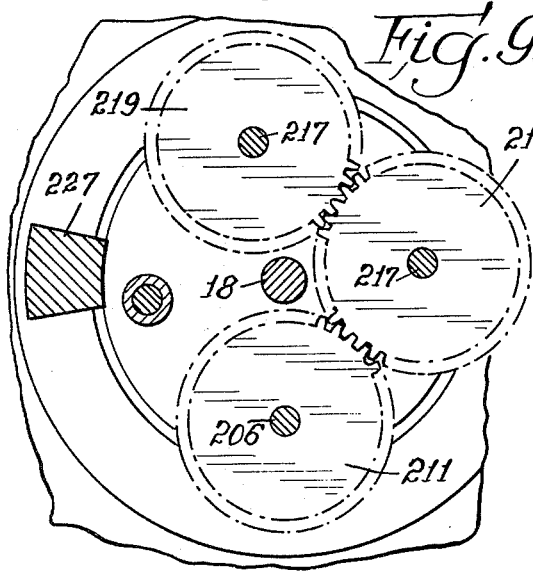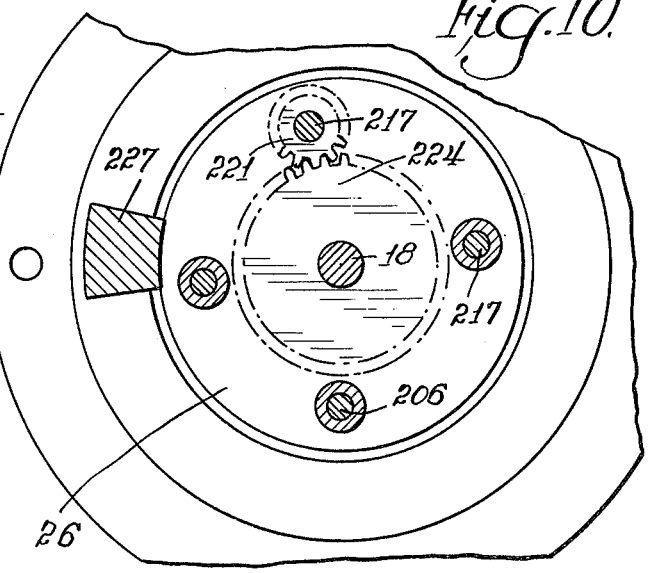

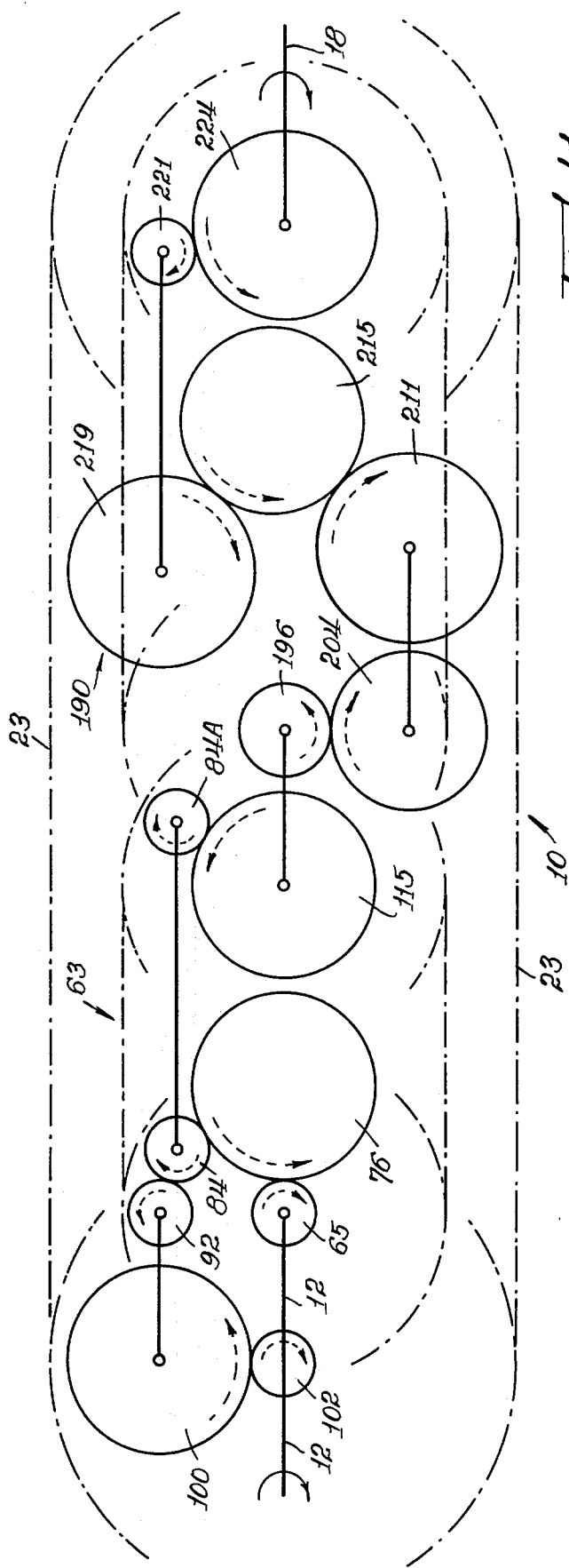
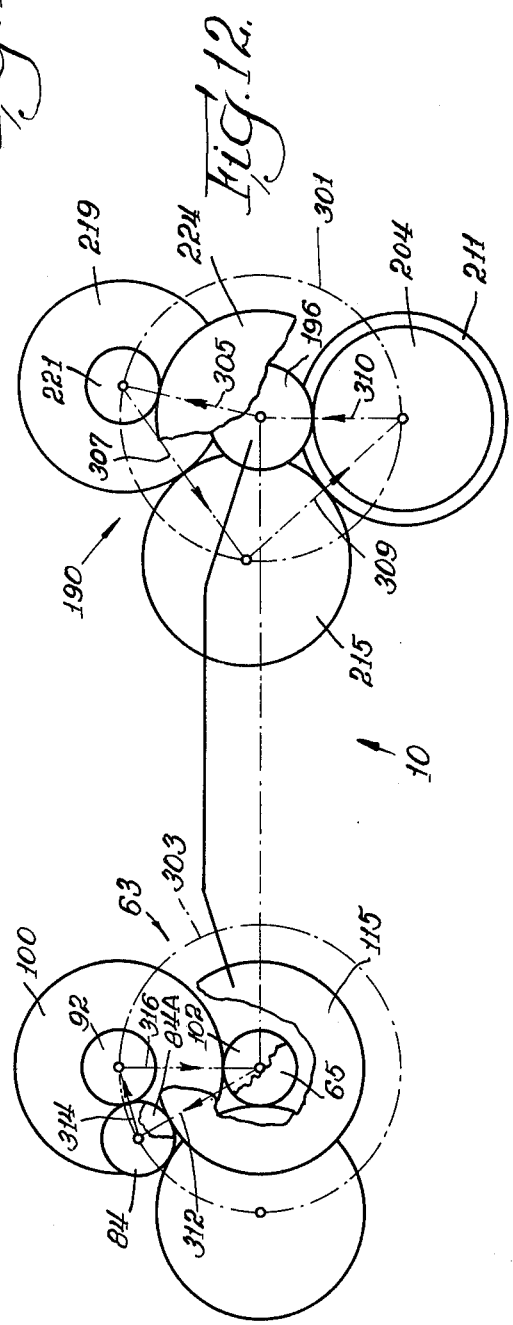

TORQUE TRANSMITTING APPARATUS

The present invention relates to a torque transmitting apparatus, and it more particularly relates to an apparatus for transmitting torque from a prime mover, such as a motor or internal combustion engine, to a load.

When a source of mechanical or electromechanical power is used to drive a load via a transmission mechanism or via a direct coupling device, the load exerts reaction forces or torques on the transmission mechanism or on the coupling device in accordance with Newton's Third Law of Physics — to every action there is always an equal and opposite reaction. The back reaction produced by the load has been dissipated as unused energy in the form of heat energy. However, the present invention relates to torque transmission apparatus which is the first such apparatus known to man to utilize directly the back reaction of a load and thus to convert directly the back reaction into a useful action. In this regard, the apparatus of the disclosed embodiment of the invention serves to increase greatly the efficiency of the prime mover.

Therefore, the principal object of the present invention is to provide a new and improved apparatus which directly utilizes the back reaction of a load and thus to convert directly the back reaction into a useful action in a highly efficient manner.

Another object of the present invention is to provide a new and improved apparatus, which drivingly connects the output of a prime mover and the input of a load and is supported by the output of the prime mover and the input of the load, and which responds to the back reaction of the load to serve as a highly efficient torque converter.

Briefly, the above and further objects are realized in accordance with the present invention by providing an apparatus which includes an input planetary gear unit adapted to be connected drivingly to the output of the prime mover, an output planetary gear unit coupled to the input unit and adapted to be connected drivingly to the input of the load, and a reaction member connecting rigidly output planet gears of the output unit and one of the input sun gears of the input unit for causing input planet gears of the input unit to orbit about the input planet gears. At least some of the input planet gears mesh with one another and extend along an input pitch circle in a given direction of reaction from the load via the output unit. Similarly, at least some of the output planet gears of the output unit mesh with one another and extend along an output pitch circle in a direction of reaction from the load opposite from the given direction for a substantially greater distance along the output pitch circle than the planet gears extend along the input pitch circle. A small one of the gears of the input unit meshes with a larger one of the gears of the outputunit to couple torque between the input and output units.

Further objects and advantages and a better understanding of the present invention will be had by reference to the following detailed description taken in connection with the accompanying drawings, wherein:

FIG. 1 is an elevational view of a torque transmitting apparatus which is constructed in accordance with the present invention and which drivingly couples the output shaft of a prime mover to a load;

FIG. 2 is an enlarged vertical cross-sectional elevational view of the apparatus of FIG. 1;

FIG. 3 is an exploded view of the apparatus of FIG. 2 without the housing;

FIG. 4 is a fragmentary cross-sectional view of the apparatus of FIG. 3 taken substantially along the line 4—4 thereof;

FIG. 5 is a cross-sectional view of the apparatus of FIG. 3 taken substantially along the line 5—5 thereof showing only the gears in the plane of the section and not of the gears in the background for illustration purposes;

FIG. 6 is a cross-sectional view of the apparatus of FIG. 3 taken substantially along the line 6—6 thereof showing the gears in the plane of the cross section and not of the gears in the background for illustration purposes;

FIG. 7 is a cross-sectional view of the apparatus of FIG. 3 taken substantially along the line 7—7 thereof;

FIG. 8 is a fragmentary cross-sectional view of the apparatus of FIG. 3 taken substantially along the line 8—8 thereof showing the gears in the plane of the cross section and not the gears in the background for illustration purposes;

FIG. 9 is a fragmentary cross-sectional view of the apparatus of FIG. 3 taken substantially along the line 9—9 thereof showing the gears in the plane of the cross section and not the gears in the background for illustration purposes;

FIG 10 is a fragmentary cross-sectional view of the apparatus of FIG. 3 taken substantially along the line 10—10 thereof;

FIG. 11 is a lay-out diagramatic view illustrating the gears of the apparatus of FIG. 3; and FIG. 12 is a diagramatic view illustrating the gears of the apparatus of FIG. 3 as viewed from the output end to the input end.

Referring now to FIGS. 1 and 2 of the drawings, there is shown a torque transmitting apparatus in the form of a torque converter 10 which is constructed in accordance with the principles of the present invention and which includes an input shaft 12 connected to an output shaft 14 of a prime mover 16, and an output shaft 18 connected via a coupling 19 to an input shaft 20 of a load 22. The prime mover 16 may be an electric motor, internal combustion engine, a turbine, or any other type of drive machine. The torque converter 10 is self-regulating by dependency on the load 22 and is without exterior support. The torque converter 10 delivers the torque for the rotation of its output shaft 18 and automatically regulates the rotational speed and torque changes of the shaft 18 within a predetermined range, determined by the torque ratio of the converter 10, while the prime mover 16 runs at its most favorable speed of rotation. Thus, the speed of the output shaft 18 is dependent on the transmission installed in the torque converter 10 and on the changes in loading of the output shaft 18 as hereinafter described in greater detail.

The torque converter 10 is a reaction-utilizing coupling mechanism of the present invention and transmits a predetermined portion of the back reaction of the load 22 backwardly to the prime mover 16 to unload it proportionately. When the load increases, the prime mover 16 is unloaded proportionately to help drive the new load, while enabling the prime mover 16 to continue to operate at about the same speed.

Considering now the torque converter 10 in greater detail with reference to the drawings, the torque converter 10 includes a housing 23 which comprises a pair of annular end cover plates 24 and 26 and a thin-wall hollow cylindrical housing member 28 which is secured to the end plates 24 and 26 by a series of bolts 27, the heads of which being disposed in counter-sunk holes 29 in the plate 26 and the opposite ends of which being threaded into tapped holes 30. As shown in FIG. 2, the housing member 28 fits at one of its ends against a gasket 32 in a peripheral groove 31 in the end cover plate 24 and at its other end surrounds a boss 33 of the end cover plate 26 against a gasket 34. While the torque converter 10 in accordance with the present invention does not require cooling during use, which cooling is needed by a conventional gear transmission, a suitable lubricant such as oil may be used in the housing 23 for lubrication purposes only and not for cooling. In this regard, the gaskets 32 and 34 serve to seal the end plates 24 and 26 to the housing member 28, to retain the oil therein, it being understood that the input shaft 12 and the output shaft 18 are suitably sealed to their respective end plates 24 and 26.

The input shaft 12 includes an enlarged hollow end coupling portion 47 which is journaled in a bearing 49 in an outwardly-facing hub 50 of the end plate 24. The bearing 49 is seated in a centrally-disposed outwardly-facing recess 51 in the end cover plate 24, and the shaft 14 is held in place within the coupling portion 47 by a set screw 53 (FIG. 3).

The shaft 12 extends through a centrally-disposed hole 61 in the end cover plate 24 and into the interior of the housing 28. At the interior of the housing 28, an input planetary gear unit 63 includes a sun gear 65 which is fixed to an intermediate portion of the input shaft 12 and rotates therewith. The unit 63 includes an axially disposed bearing 66 which receives the distal end of the shaft 12. As best seen in FIG 6, the gear 65 meshes with a larger planet gear 76 which is rotatably mounted on a jackshaft 78 which is fixed to and extends between a pair of planet carriers 80 and 82. The gear 76 meshes with a smaller idler gear 84 which is rotatably mounted on a jackshaft 86 between the planet carriers 80 and 82. The smaller gear 84 meshes with another smaller gear 92 which is rotatably mounted on a jackshaft 94 between the planet carriers 80 and 82. It is to be understood that the planet carriers 80 and 82 are connected together as a unit at various points, such as at the jackshaft 78 which connects the carriers 80 and 82 together. The gear 92 is integral with a larger planet gear 100 which in turn meshes with a smaller sun gear 102 which is fixed to the end cover plate 24 and surrounds and freely rotates about the input shaft 12. As best seen in FIG. 2, the gear 102 extends from and is fixed to a hub 104 which is securely fixed to the plate 24 in axial alignment with the hole 61. Surrounding the hub 104 is a ball bearing 111 to permit the carrier 82 to rotate freely about the hub 104.

The smaller gear 84 is an elongated gear so that it also meshes with the teeth 115 of a sun gear 117 which is fixed to the bearing 66 which in turn surrounds and freely rotates about the input shaft 12. It should be noted that in the diagramatic views shown in FIGS. 11 and 12, the elongated gear is shown as two separate gears 84 and 84A which are fixed together as one gear. The gear 117 extends through a centrally-disposed opening of the carrier 80 and carries the inner race of a ball bearing 119 which fits in a recess of the carrier 80 and is secured therein. The planetary gear unit 63 has a counter-balanceweight 123 which is fixed to the annular carriers 80 and 82. The weight 123 has a pair of oppositely-disposed flanges 125 and 128 which are press-fitted into the respective inwardly-facing peripheral grooves 130 and 132 of the respective annular carriers 82 and 80. As shown in FIGS. 3 and 5 of the drawings, a block 135 is fixed to the carrier 82 and serves to support one end of the jackshaft 86 for the gear 84. In order to provide space for the larger gear 100, a slot 137 receives the larger gear 100.

The gear 117 also extends through a centrally-disposed opening in an annular carrier 188 of an output planetary gear unit 190. The inner race of a ball bearing 192 surrounds the elongated hub portion of the gear 117, and the bearing 192 fits into a recess of the annular carrier 188 and is secured therein. A sun gear 196, which is the first gear of the planetary gear unit 190, is fixed to the elongated hub of the gear 117. A reduced end portion of the output shaft 18 is journaled in the bearing 66. The gear 196 meshes with a larger planet gear 204 which is rotatably mounted on a jackshaft 206 which is connected at one end to the annular carrier 188 and at its opposite end to the plate 26 forming a part of the housing 23, the plate 26 also serving as a planet carrier. It is to be understood that the carrier 188 and the end plate 26 are connected together to form a unit in a similar manner as the carriers of the input planetary gear unit 63. A larger gear 211 is also fixed to the same jackshaft 206 as the gear 211 so that the two gears 204 and 211 turn in unison. The gear 211 in turn meshes with a similar size planet gear 215 which is rotatably mounted on a jackshaft 217 which is connected to the planet carrier 188 and the end cover plate 26. The gear 215 in turn meshes with another similar size planet gear 219 which is rotatably mounted on the jackshaft 217. A smaller planet gear 221 is fixed to the same jackshaft 217 as the gear 219 so that both the gears 221 and 219 rotate in unison. A larger sun gear 224 meshes with the smaller planet gear 221 and is fixed to the output shaft 18. A pair of bearings 223 and 225 mounted within an external hub 226 of the end plate 26 journal the output shaft 18 for rotation. A counterweight 227 is fixed to the carrier 188 and the end plate 26 in the same manner as the counterweight 123 for the input planetary unit 63. In this regard, both the input planetary unit 63 and the output planetary unit 190 are each balanced about their longitudinal axis so that the overall torque converter 10 is balanced about its longitudinal axis.

As an example of the gear ratios which may be used for the gears of the torque converter 10 to provide a torque multiplication of three-to-one, the following is a list of the number of teeth of each one of the gears of the torque converter 10.

| Gear | Number of teeth |
| --- | --- |
| 65 | 12 |
| 76 | 36 |
| 84 | 12 |
| 84A | 12 |
| 92 | 12 |
| 100 | 36 |
| 102 | 12 |
| 115 | 36 |
| 196 | 18 |
| 204 | 30 |
| 211 | 36 |
| 215 | 36 |
| 219 | 36 |
| 221 | 12 |
| 224 | 36 |

Considering now the operation of the torque transmitting apparatus in the form of the torque converter 10 with reference to the drawings, and more particularly to FIGS. 11 and 12 thereof, the torque converter 10 has a torque multiplication ratio of three-to-one as a result of the gear ratios of the gears of the torque converter 10. Without a load on the output shaft 18, the entire torque converter 10 rotates about its longitudinal axis, and the input shaft 12, the output shaft 18 and the housing 23 rotate in unison, whereby no torque conversion occurs. However, when the output shaft 18 is driving the load 22 and the load increases, the back reaction torque exerted on the output shaft 18 by the load causes the rotational speed of the shaft 18 to decrease, and two-thirds of the back reaction is transmitted backwardly to the input shaft 12 to unload the prime mover 16 by two-thirds of its output torque. Since two-thirds of the output torque of the prime mover 16 is unloaded, the back reaction on the housing of the prime mover is only one-third of the total back reaction of the load 22 and is absorbed by the housing of the prime mover 16. The output shaft 14 of the prime mover continues to supply one-third of the torque necessary to drive the load 22 and thus to exert a full three-thirds torque necessary for driving the load via the three-one reduction gears 65 (input) and 224 (output) to the output shaft 18. In this regard, due to the ratio of all of the gears of the torque converter 10, the gear ratio between the output shaft and the input shaft is three-to-one. Thus, as the load increases within the torque multiplication of the torque converter 10, the housing continues to rotate in the same direction but at a decreasing speed.

Referring now to FIG. 11, in accordance with the present invention, when the load increases on the output shaft 18, a back torque reaction is exerted on the large sun gear 224, which in turn exerts a back reaction radially outwardly to the smaller planet gear 221. From there, the back reaction is exerted from one of the planet gears to the next, and in this regard, the back reaction is exerted from the gear 219 to the gear 204 via the gears 211 and 215. From the planet gear 204, the back reaction is then exerted on the samller sun gear 196. This back reaction exerted through the output planetary gear unit 190 causes a reaction torque to be applied to the housing 23 in a direction which is opposite to the direction of its rotation (the direction of rotation of the input shaft 12 and the output shaft 14 of the prime mover) as hereinafter described in greater detail.

From the sun gear 196 of the unit 190, the back reaction is then transferred to the input planetary gear unit 63. In this regard, the reaction is transferred to the larger sun gear 115, and from there the reaction is transferred radially outwardly to the smaller planet gear 84A and then along the planet gears 84, 92 and 100. From the gear 100, the reaction is then transferred to the smaller sun gear 102 which is fixed to the housing 23. As hereinafter described in greater detail, the reaction being applied to the sun gear 115 of the input planetary unit 63 tends to cause the housing 23 to rotate in the forward direction or the direction in which the prime mover is rotating the torque converter 10. However, as hereinafter described in greater detail, the reaction applied to the housing 23 by the unit 190 is substantially greater than the reaction applied by the unit 63 to the housing and therefore the housing 23 slows down in its speed. Therefore, in accordance with the present invention, the housing 23 serves as a reaction member since it is fixed to the gear 102 of the unit 63 and serves to work in opposition to the reaction torque extending through the gears of the unit 63, whereby the carriers 80 and 82 of the input unit 63 begin to rotate. As a result, the reaction torque applied as mentioned previously causes the gear 76 to drive the smaller gear 65 which is fixed to the input shaft 12. The reaction torque causes the gear 65 to apply a torque to the input shaft 12 in the same direction it is being driven by the prime mover 16 for the purpose of unloading it. As a result, the speed of the prime mover 16 decreases only slightly and a torque multiplication occurs since the overall gear ratio of the torque converter 10 between the input shaft 12 and the output shaft 18 is three-to-one. It should be noted that in the diagramatic drawing of FIG. 11 that the solid curved arrows on the input and output shafts indicate the direction of rotation of the unit 10 and of the direction of rotation of the output shaft 14 of the prime mover 16. The broken curved arrows indicate the direction of the reaction torque acting on the individual gears.

The unbalance of reaction torque acting on the housing 23 is caused by the fact that the forward torque being transmitted from the prime mover 16 and the back reaction from the load 22 are equalized between the input unit 63 and the output unit 190 at the gears 196 and 204. For the torque multiplication ratio and the relative sizes of the gears for the unit 10, the 18 teeth gear 196 and the 30 teeth gear 204 provide the proper balance. If two gears each having 24 teeth were used, instead of the gears 196 and 204, the back reaction would be equalized exactly between the two units. However, by using the reduction gears 196 and 204 the desired effect is achieved since a greater torque is applied through the reduction gears 196 and 204 on the input to the output planetary gear unit 190 for causing it to apply a greater reaction torque to the housing 23. The exact sizes of the gears 196 and 204 were arrived at by the following consideration: For the pitch circle and the gear sizes of the unit 10, equal size gears would have to each have 24 teeth. By subtracting 12 from 24, to arrive at the smallest size gear of 12 teeth, the remaining 12 teeth would have to be split equally between the two gears. In this regard, 6 teeth were added to the smaller 12 teeth sun gear to arrive at an 18 teeth gear, and 6 teeth are then added to the 24 teeth planet gear to arrive at the 30 teeth gear 204.

In order to achieve the unbalance of reaction torque on the housing 23, in accordance with the present invention, the planet gears of each one of the units 63 and 190 are arranged in a certain manner. As shown in FIG. 12, it should be noted that there are three 36 teeth planet gears, namely, gears 211, 215 and 219, arranged on the pitch circle 301. Whereas, the planet gears being affected by the reaction torque extend along a much shorter distance on the pitch circle 303 of the input unit 63. In this regard, with reference to the output unit 190, the reaction extends along a radial line 305 from the axis of the unit 10 outwardly radially to the axis of the gears 221 and 219. From there, the reaction extends along a line 307 to the axis of the gear 215, and from there along a line 309 to the axis of the gears 204 and 211. From that axis, the reaction extends along a line 310 radially back to the axis of the unit 10. Thus, as viewed in FIG. 12 of the drawings, the reaction extends in a counterclockwise direction over a relatively long distance along the pitch circle 301.

By contrast, in considering the unit 63, the reaction extends from the central longitudinal axis of the unit 63 radially outwardly along a line 312 radially outwardly to the axis of the gear 84. From there, the reaction extends along a line 314 to the axis of the planet gears 92 and 100. From that axis, the reaction then extends along a line 316 radially inwardly to the axis of the gear 102, which axis is also the central longitudinal axis of the unit 63. Thus, the reaction extends in a clockwise direction over a relatively short distance along the pitch circle 303 as compared to the reaction of the output unit 190. It has been discovered that such an arrangement produces a stronger reaction on the housing 23 by the output unit 190 as compared to the input unit 63 and in an equal and opposite direction.

In order to have different desired torque multiplication ratios, the sizes of the gears can be changed to fit any desired torque multiplication ratio as will become apparent to those skilled in the art. Thus, a four-to-one ratio may be achieved by employing 48 teeth gears in place of the 36 teeth gears and employing the appropriate size pitch circles and gears 196 and 204.

While the present invention has been described in connection with a particular embodiment thereof, it will be understood that many changes and modifications of this invention may be made by those skilled in the art without departing from the true spirit and scope thereof. Accordingly, the appended claims are intended to cover all such changes and modifications as fall within the true spirit and scope of the present invention.

The embodiments of the invention in which an exclusive property or privilege is claimed are defined as follows:

1. An apparatus for transmitting torque from a prime mover to a load, comprising:
    an input planetary gear unit adapted to be connected drivingly to the output of the prime mover, said input unit including a plurality of input sun gears and a plurality of input planet gears;
    an output planetary gear unit coupled to said input unit and adapted to be connected drivingly to the input of the load, said output unit including a plurality of output sun gears and a plurality of output planet gears; and
    reaction means connecting rigidly said output planet gears and one of said input sun gears for causing said input planet gears to orbit about said input sun gears.

2. An apparatus according to claim 1, wherein at least some of said input planet gears mesh with one another and extend along an input pitch circle in a given direction of reaction from the load via said output unit.

3. An apparatus according to claim 2, wherein at least some of said output planet gears mesh with one another and extending along an output pitch circle in a direction of reaction from the load opposite from said given direction, said input pitch circle having substantially the same diameter as the diameter of said output pitch circle, said at least some of said output planet gears extending substantially further along said output pitch circle than said at least some of said input planet gears extend along said input pitch circle.

4. An apparatus according to claim 1, a small one of said gears of said input unit meshes with a larger one of said gears of said output unit to couple torque between said input unit and said output unit.

5. An apparatus according to claim 1, wherein one of said input sun gears of said input unit is connected fixedly to the output of the prime mover and meshes with one of the input planet gears, another one of said input sun gears of said input unit being fixed to said reaction means.

6. An apparatus according to claim 1, wherein said reaction means comprises a cylindrical housing.

7. An apparatus according to claim 1, wherein one of said input sun gears is adapted to be connected fixedly to the output of the prime mover, one of said output sun gears being adapted to be connected to the input of the load, the last-mentioned input sun gear being substantially smaller in diameter than the last-mentioned output sun gear.

8. An apparatus according to claim 7, wherein at least some of said input planet gears mesh with one another and extending along an input pitch circle in a given direction of reaction from the load via said output unit.

9. An apparatus according to claim 8, wherein at least some of said output planet gears mesh with one another and extend along an output pitch circle in a direction of reaction from the load opposite from said given direction, said input pitch circle having substantially the same diameter as the diameter of said output pitch circle, said at least some of said output planet gears extending substantially further along said output pitch circle than said at least some of said input planet gears extend along said input pitch circle.

10. An apparatus according to claim 9, wherein one of said input sun gears of said input unit is connected fixedly to the output of the prime mover and meshes with one of the input planet gears, another one of said input sun gears of said input unit being fixed to said reaction means.

11. An apparatus according to claim 6, wherein said reaction means comprises a cylindrical housing.

* * * * *